Sept. 22, 1931.   VAN RENSSELAER P. SAXE   1,824,631
METAL CONNECTION FOR BUILDING FRAMES
Filed April 23, 1930
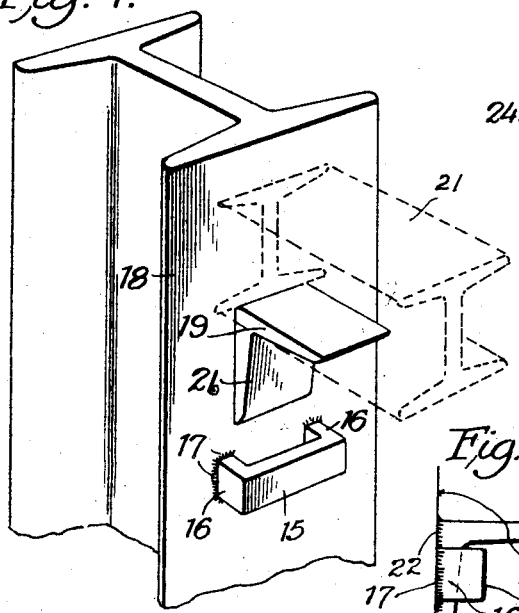
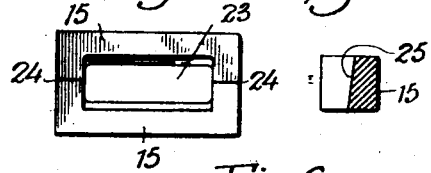
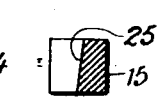
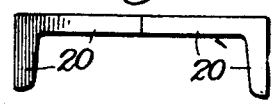
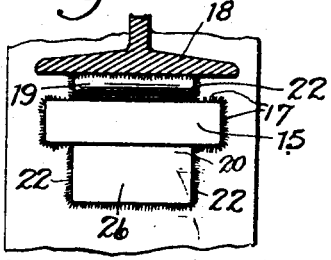
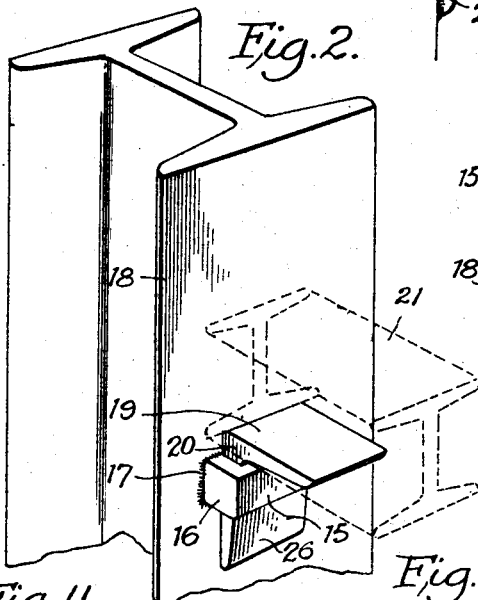
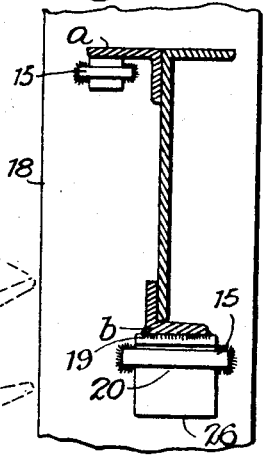
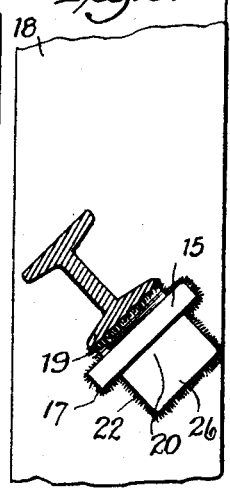
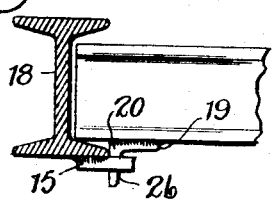
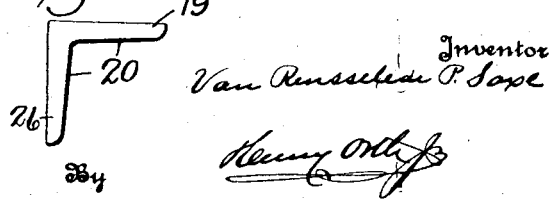
Inventor
Van Rensselaer P. Saxe
By Henry Orth
Attorney Patented Sept. 22, 1931

1,824,631

UNITED STATES PATENT OFFICE

VAN RENSSELAER POWELL SAXE, OF BALTIMORE, MARYLAND

METAL CONNECTION FOR BUILDING FRAMES

Application filed April 23, 1930. Serial No. 446,592.

My invention relates to seats, fastenings, or clips to use in erecting the rolled metal frames for buildings and has for its object to dispense with the use of rivets, bolts, temporary clamps etc., and to make an all welded job.

The rolling mills make standard lengths of rolled shapes as channels, I-beams, angles etc., of various standard sizes.

The standards are delivered to the fabricator's shop where they are cut to unit or lengths, punched for rivets and provided with certain connecting elements riveted to them by which the elements are to be first temporarily bolted and then finally riveted together according to the specifications and plans of the architect.

In cutting these lengths, for columns, beams, plates, and similar structural shapes there is a considerable waste in short discarded ends or pieces that usually are too short to use for standard connections and have to be sold as scrap. Some short pieces are now used in riveted joints but by no means is the present use sufficient to prevent a large accumulation of small scrap by the fabricator.

One object of my invention is to reduce this accumulation of small scrap by making a greater use of it in erecting the structural iron frames of buildings.

Another object is to make use of channel iron scrap, which so far as I know, is not now used for the connections for beams.

Another object is to make an all welded job and avoid the necessity of the use of rivets and their objectionable features as well as avoid the use of temporary construction bolts at present used to hold material in place before field welding can be done. I very materially reduce the cost of erection in the construction of heavy structural metal frames for buildings by eliminating the punching of the members and riveting them together prior to the finished erection.

I also save a considerable labor cost in the time required to make the temporary connection of the frame members preparatory to making the final connection in my case, the final welding of the parts in place.

Referring to the drawings in which like parts are similarly designated,

Figure 1 is a perspective view showing my invention where the end of a beam is about to be placed in position on a column;

Fig. 2 is a similar view showing the beam in position ready for welding;

Fig. 3 is a side view of the connection in place;

Fig. 4 is a plan view of punched plate from which the yoke members are made;

Fig. 5 is a cross section of a yoke member;

Fig. 6 shows a scrap of channel iron which may be served to form two angle members to seat in the yoke;

Fig. 7 is a front view of the finished connection, welded in place.

Fig. 8 shows a deep, built-up beam using two connections to prevent the beam from tilting;

Fig. 9 shows how the connection may be used at an angle;

Fig. 10 shows a section of an angle iron for use in co-operation with my yoke member;

Fig. 11 shows a connection between two I beams using my invention.

My invention comprises a yoke member such as 15, whose two legs 16 are welded as at 17 to a column or other structural element for example as 18 in the fabricating shop.

Preferably the three edges of each leg 16 of the yoke member 15 are welded at the proper place onto the structural element in the fabricating shop. One flange 19 of the angles 20 is also welded to the beam elements 21 for entrance in their yoke member. This flange 19 of the angle member is also welded to the beam in the fabricating shop and preferably along its three edges.

In erecting the frame of a building it is only necessary to drop the beams into place so that the free leg 26 of the angle iron on the beam enters the yoke. No temporary bolts have to be used to hold the beam in place.

After the beam is in place the edges of the free leg 26 are welded to the upright, or column member as at 22, an operation much quicker and cheaper than riveting.

In most cases this marginal welding of the yoke and angle is quite sufficient for strength in any building but if desired the beam itself may be welded to the column, when specifications require it.

My mode of erection enables a ready means of connecting beams to uprights at an angle as illustrated in Fig. 9 and also permits as ready a connection of deep beams to columns as shown in Fig. 8 of beams to the other beams where the connection can be used with both the top and bottom flanges of the beam as shown at $a$ and $b$. The lower angle member being a section of an angle iron 20 whose flanges are substantially equal while the upper angle at $a$ is a section of a channel which has a short flange compared to the web portion to facilitate erection by first inserting the longer leg of the lower angle iron in its yoke and thereafter inserting the shorter flange of the piece of channel in its yoke member.

The yokes are made from rectangular plate Fig. 4, punched with a rectangular hole 23 and then cut at 24 to form two yoke members. The punching of the hole 23 causes a slight taper 25 on the inner surface of the yoke member by maintaining a suitable dimension of the punch and die.

By the fact that the contacting surfaces of column and angle member are rolled surfaces, hence not perfectly smooth, they do not fit against one another to make a perfectly tight temporary joint as with machined surfaces.

This is an advantage in that when the weld is affected between them and cools there is sufficient space to allow the parts to draw tightly together by the cooling of the weld about the leg 21 so that the weld does not crack or give way in any respect as shown by extensive use.

The welding of the leg 26 on the beam onto the column or other structural element is the only field operation to be made, is simple, rapid and of much less cost than inserting rivets, and avoids the necessity of weakening the metal by punching it.

I am aware that sheet metal has been connected by forming a hook on one end of an element that enters a slot cut in the contiguous element, but this requires special fabrication of the ends and bodies of the elements to be connected, which with frames for buildings of heavy, rolled shapes is too expensive and besides entails too large an amount of loss from cutting and handling in the fabricating shop to say nothing of the impossibility of punching or shaping heavy structural material in such manner.

Preferably the width of the slot in the yoke, i. e. the distance between its two legs is slightly greater than the width of the flange of the angle that enters it to allow lateral play of a small fraction of an inch.

Referring to Figure 6, in this form, the angle brackets 20 are formed by longitudinally splitting ends of channel beams which are ordinarily wasted in fabricating plants incident to cutting channels to predetermined lengths.

I claim—

1. The combination with a vertically disposed metallic building element, a horizontally disposed metallic building element terminating adjacent the first mentioned building element, of a connection between said elements, said connection comprising a weld-connected U-shaped yoke carried by the vertically disposed building element, an angle bracket carried by the horizontally disposed building element, one arm of said bracket extending downwardly with its outer face at a right angle to the horizontally disposed building element, the inner face of said arm being at an obtuse angle to said horizontally disposed building element and cooperating with the yoke whereby the outer face of the arm is forced into close engagement with the vertical building element for a welding operation below the yoke, said arm of the bracket terminating a substantial distance below the yoke for said welding operation.

2. The combination with adjacent building elements at angles to each other, of a connection between said elements, said connection comprising a weld connected yoke carried by one of said elements, a tapered flange carried by the other element and of a length greater than the depth of the yoke, an inclined surface on the inner side of said yoke, said inclined surface cooperating with the wedge shaped flange whereby said flange is forced into close engagement with one of the building elements for a close welding connection between the flange and the building element below the yoke.

3. A connection between adjacent building elements at angles to each other, said connection comprising a yoke carried by one of said elements, a tapered member carried by the other element and of a length greater than the depth of the yoke, said tapered member cooperating with the yoke, whereby said member is forced into close engagement with the yoke carrying building element and means connecting said tapered member to the yoke carrying building element located to the side of the yoke opposite the building element on which the tapered member is mounted.

4. A connection between adjacent building elements at angles to each other, said connection comprising a yoke carried by one of said elements, an angularly disposed yoke carried by the other element and extending through the yoke and terminating at a point spaced from the opposite side of the yoke, wedge engagement between the angularly disposed member and the yoke whereby said angularly disposed member is forced into close engagement with the yoke carrying member and means connecting the portion of the angularly disposed member to the yoke carrying member located to the side of the yoke opposite the building element on which the angularly disposed member is mounted.

In testimony that I claim the foregoing as my invention, I have signed my name.

VAN RENSSELAER POWELL SAXE.